US007146412B2

(12) United States Patent
Turnbull (10) Patent No.: US 7,146,412 B2
(45) Date of Patent: Dec. 5, 2006

(54) SYSTEM AND METHODS FOR THE AUTOMATIC DISCOVERY, NOTIFICATION AND INSTALLATION OF FIRMWARE UPGRADES

(75) Inventor: Paul F. Turnbull, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1010 days.

(21) Appl. No.: 09/941,212

(22) Filed: Aug. 27, 2001

(65) Prior Publication Data
US 2003/0041127 A1 Feb. 27, 2003

(51) Int. Cl.
G06F 15/16 (2006.01)
G06F 15/177 (2006.01)
G06F 9/44 (2006.01)

(52) U.S. Cl. .............. 709/220; 709/206; 709/207; 717/173

(58) Field of Classification Search ............... None
See application file for complete search history.

(56) References Cited

U.S. PATENT DOCUMENTS

| | | | |
|---|---|---|---|
| 6,353,926 B1* | 3/2002 | Parthesarathy et al. | 717/170 |
| 6,457,076 B1* | 9/2002 | Cheng et al. | 710/36 |
| 6,539,422 B1* | 3/2003 | Hunt et al. | 709/217 |
| 6,546,492 B1* | 4/2003 | Walker et al. | 713/200 |
| 6,754,895 B1* | 6/2004 | Bartel et al. | 717/171 |
| 2001/0054152 A1* | 12/2001 | Nakao et al. | 713/182 |
| 2002/0067504 A1* | 6/2002 | Salgado et al. | 358/1.15 |
| 2002/0140966 A1* | 10/2002 | Meade et al. | 358/1.15 |
| 2002/0143924 A1* | 10/2002 | Iga | 709/223 |
| 2002/0143952 A1* | 10/2002 | Sugiarto et al. | 709/227 |
| 2002/0184350 A1* | 12/2002 | Chen | 709/221 |

FOREIGN PATENT DOCUMENTS

WO WO0017749 * 3/2000

OTHER PUBLICATIONS

Anonymous, "Electronic document library search method for e.g. digital printing systems—has user request update of document type with e-mail notification on identification of matching document", Sep. 1998, Derwent Abstract.*

* cited by examiner

Primary Examiner—Krisna Lim
Assistant Examiner—Hassan Phillips (57) ABSTRACT

The system and methods described herein relate to upgrading firmware and other device specific software such as device drivers on computing devices. An applet or upgrade module on a computing device is configured to periodically search predesignated locations for firmware or driver upgrades, compare available upgrades with the current version on the computing device and send email notifications when an available upgrade is suitable for installation onto the device. The email notifications are configured by the applet with an option that permits an email recipient to have the upgrade automatically installed onto the computing device.

25 Claims, 4 Drawing Sheets

SYSTEM AND METHODS FOR THE AUTOMATIC DISCOVERY, NOTIFICATION AND INSTALLATION OF FIRMWARE UPGRADES

TECHNICAL FIELD

The present invention relates to upgrading device firmware, and more particularly, to automatically discovering when firmware upgrades are available, notifying a user of such firmware upgrades and installing such firmware upgrades.

BACKGROUND

Computing devices such as personal computers (desktop PCs, laptop PCs, pocket PCs, etc.), printers, scanners, fax machines, PDAs (personal digital assistants), modems, cell phones and the like, typically include some type of firmware programming that is loaded into read-only memory (ROM) on a one-time or infrequent basis so that it thereafter seemingly becomes part of the device hardware. ROM is very secure, non-volatile memory (i.e., it does not lose its content when the power is turned off) that prevents the inadvertent disruption by a user of information stored in the ROM. Firmware usually includes essential system programs that are installed in programmable ROM (PROM) with a special user interface such as a PROM burner. Erasable PROM (EPROM) allows data stored in ROM to be erased (using an ultra-violet light) and rewritten. Electrically erasable PROM (EEPROM), which generally includes flash memory, permits the ROM to be rewritten using a special software program. EEPROM, such as flash memory, provides a convenient way of allowing users to upgrade device firmware. Examples of the sorts of control code stored as firmware in ROM include the basic input/output system (BIOS) in a personal computer and the printer control module in a printing device.

There are generally two types of firmware upgrades. The first type of firmware upgrade is designed to fix a device defect. For example, a manufacturer may discover that its new printer has difficulty interacting with a particular type of file that users attempt to print from their computers. The printer manufacturer can create a "firmware patch" to be installed as an upgrade to the existing firmware on the new printers that solves the problem and allows printing of the particular file. A second type of firmware upgrade results from a designed improvement to the device. For example, a manufacturer may develop firmware that provides two-sided printing (duplexing) capability in a printer that was originally released without such a capability. The manufacturer can provide the firmware upgrade to users as an option to increase the functionality of their printers.

Installation of firmware upgrades can occur in a number of ways. For example, a user can install a firmware upgrade from a portable data medium such as a compact disk (CD) or a floppy disk. A system administrator for a large company may also use a portable data medium to transfer a firmware upgrade onto a local server. The administrator can then notify employees of the available upgrade so they can access the upgrade via a local network and install it on their devices. A device manufacturer or third party software vendor can also make a firmware upgrade available to be downloaded from a particular URL (uniform resource locator) address on the Internet.

Although these methods of accessing and installing firmware upgrades are generally successful, they suffer several disadvantages. A first disadvantage involves the difficulty in notifying device users that a firmware upgrade is available for their device. Regardless of how the upgrade is made available (i.e., by a portable data medium, a network, or both), a user who is unaware of an available upgrade cannot take advantage of it. One method currently used to notify users about a firmware upgrade requires registration of the product with the manufacturer or third party software vendor. Product registration allows the firmware developer to send an email or written notification to a registered user that contains information about the upgrade and how the user can obtain the upgrade. The problem with this method is that the user must first be aware of the registration/notification process. Thus, the method of notification itself creates a problem of how to ensure that users are informed about the availability of the registration/notification process. In addition, many users who are aware of the registration/notification process either forget to or are reluctant to provide registration information that will ensure their inclusion in the process.

Another disadvantage of prior methods of accessing and installing firmware upgrades is that they require the user to determine whether or not the currently installed firmware version is the same as or older than the available upgrade. Thus, the user must first search the device for identifying information indicating which firmware version is currently installed, and then compare that to identifying information from the available firmware upgrade. Although this task seems straight forward, many users simply opt to continue using their current firmware version rather than taking the time to determine whether the upgrade would be of benefit to them.

Yet another disadvantage of prior methods of accessing and installing firmware upgrades is that they require a user to locate, access and install the upgrade onto the associated device. Once it is determined that a firmware upgrade is available for a device, the user must know where to access the upgrade. As discussed above, upgrades are typically made available on a portable data medium or via a network connection. In any event, the user must determine where to find the upgraded firmware and then obtain a copy and install it onto the device. The difficulties associated with discovering when a firmware upgrade is available, determining whether the upgrade is more recent than a currently installed firmware version, and locating, accessing and installing the upgrade often discourage users from taking advantage of available firmware upgrades.

Accordingly, the need exists for a way to determine when a firmware upgrade is available for a device, notify the device user about the firmware upgrade, and install the upgrade to the device in a manner that makes the upgrade readily accessible and requires less effort from the user.

SUMMARY

An applet, or small application program, installed on a computing device is configured to automatically determine when a firmware upgrade is available for the device and to install the upgrade onto the device. An alert mechanism notifies the user of an available firmware upgrade and enables the user to determine when and if the upgrade should be automatically installed on the device.

The upgrade applet is configured with one or more search addresses that are predetermined to provide likely locations for the latest firmware upgrades. The addresses typically include URL (uniform resource locator) addresses to Web page locations accessible by the computing device via the Internet or addresses to files on local servers accessible by the computing device over a local network.

In addition to searching for a firmware upgrade at various predetermined locations, the applet is configured to search the computing device for the version of firmware currently installed on the device. The current firmware version is compared to an available firmware upgrade in order to determine if the upgrade will provide a more recent firmware version than is already installed on the device.

The applet is further configured with an alert mechanism that sends an email notification to one or more preset email addresses when an appropriate firmware upgrade is found. Typically, during the initial installation of the applet onto the computing device, a user provides email addresses that are used by the applet to send email messages notifying the recipient when an available firmware upgrade is discovered. An email notification includes a selectable (i.e., clickable) option that is configured to automatically install the firmware upgrade onto the device or to browse to the location of the firmware upgrade so a user can complete an electronic commerce (e-commerce) transaction resulting in the downloading and installation of the firmware upgrade onto the device. Additional information provided in an email notification typically includes the current firmware version installed on the device, the location of the firmware upgrade, what costs are associated with the firmware upgrade and what billing data may be required to complete an e-commerce transaction.

Computing devices capable of implementing the upgrade applet include devices having a processor that executes firmware stored in a reprogrammable non-volatile memory such as EEPROM or flash memory. The computing devices are also capable of operating in a networked environment using physical or logical connections to one or more computers, such as a remote server via the Internet or a local server over a local network. Therefore, the computing device can be any of a wide variety of computing devices, such as a personal computer, a printer, a scanner, a copier, a facsimile machine, a multifunction peripheral device, a modem, a cellular telephone, a personal digital assistant (PDA) and the like. The devices typically have embedded Web browsers or are coupled to secondary devices such as personal computers that are capable of executing a browser application.

A typical system embodiment includes a computing device coupled to a local server through a local network and/or to a remote server through a wider network such as the Internet. In a particular embodiment, the upgrade applet on the computing device initiates a search for a firmware upgrade at the request of the device user. In another embodiment, the applet initiates a search for a firmware upgrade automatically on a periodic basis, with the frequency of the search being set by the user upon installation of the applet onto the computing device.

The benefits of the system and methods described herein include automatic discovery, notification, and installation of firmware upgrades for computing devices. The automatic discovery and email notification of firmware upgrades provides device users with effortless access to information about available firmware upgrades along with control over when and if a firmware upgrade should be installed onto a computing device.

BRIEF DESCRIPTION OF THE DRAWINGS

The same reference numbers are used throughout the drawings to reference like components and features.

DETAILED DESCRIPTION

The system and methods described herein relate to upgrading firmware and other device specific software such as device drivers on computing devices. An applet or upgrade module on a computing device is configured to periodically search predesignated locations for firmware or driver upgrades, compare available upgrades with the current version on the computing device and send email notifications when an available upgrade is suitable for installation on the device. The email notifications are configured by the applet with an option that permits an email recipient to have the upgrade automatically installed on the computing device.

Exemplary System for Upgrading Firmware on a Computing device

Figure 1:
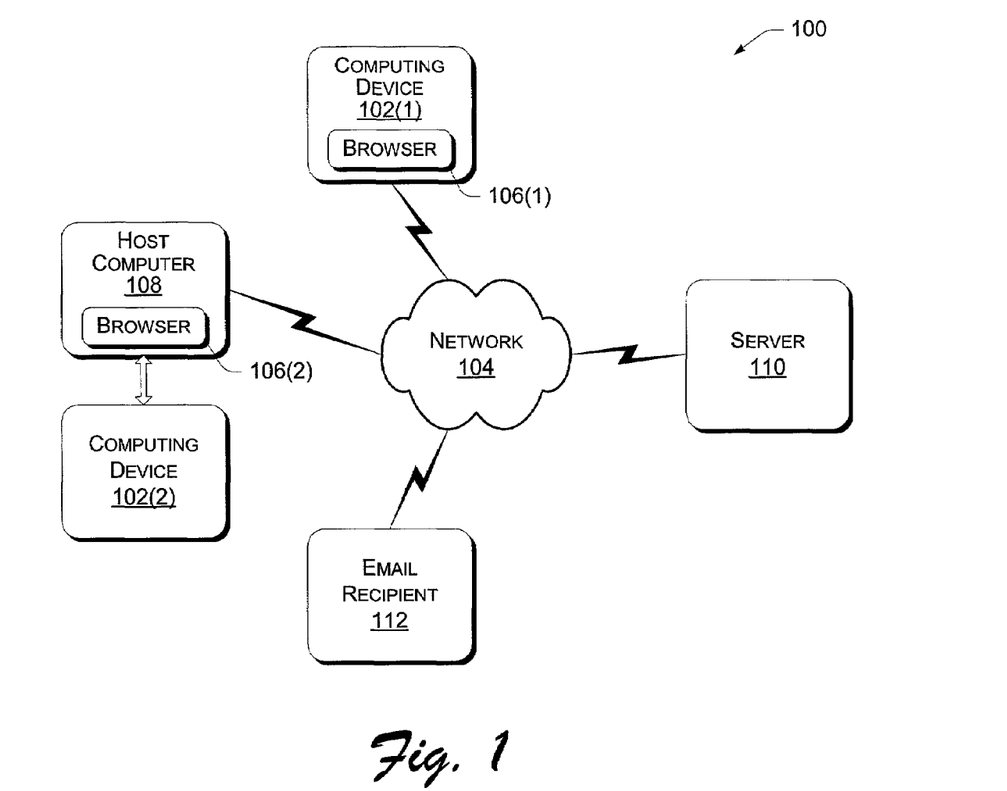
FIG. 1 illustrates computing devices in a system environment suitable for providing an automatic firmware upgrade to the computing devices.
Figure 2:
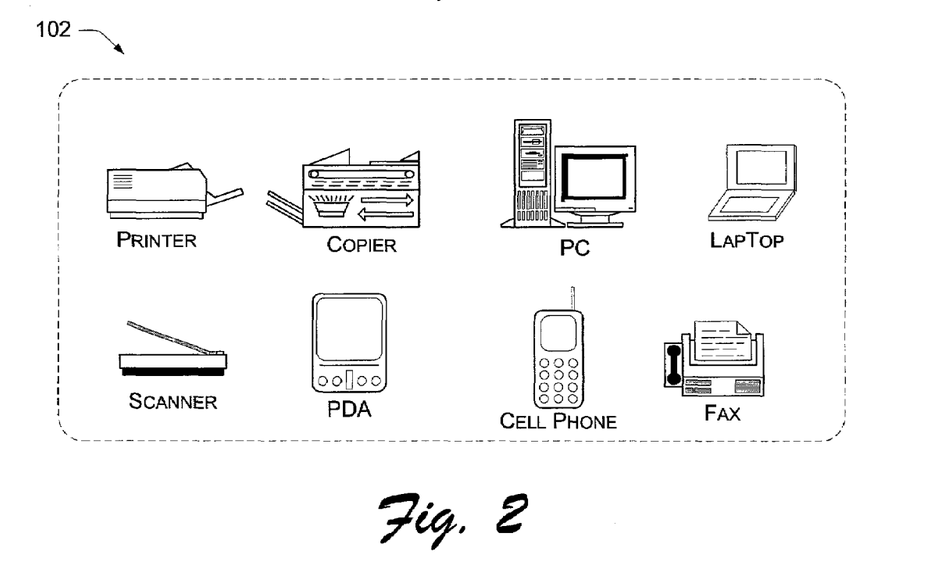
FIG. 2 illustrates examples of various computing devices that are suitable for use in the system environment of FIG. 1.

FIG. 1 illustrates an example of a system environment 100 suitable for upgrading firmware on a computing device 102. Computing device 102 can be implemented as a variety of general purpose and special purpose devices. Examples of general purpose and special purpose computing devices 102 are illustrated in FIG. 2. As shown in FIG. 2, computing devices 102 include devices such as printers, copiers, scanners, fax machines, personal computers (PC's), laptop computers, personal digital assistants (PDA's), cell phones and the like. The devices illustrated in FIG. 2 are provided by way of example only and not by way of limitation. Thus, as will become apparent through further discussion of FIGS. 1–3, computing device 102 can include any device that executes firmware and/or other device specific software stored in nonvolatile programmable memory, and that has access to upgrades to such firmware and software via a communication link such as network 104.

Computing device 102 can also be implemented in a variety of configurations such as those illustrated in FIG. 1. For example, computing device 102(1) illustrates a single computing device such as a printer that includes an embedded browser 106(1) to facilitate navigation of network 104. Computing device 102(2) illustrates a computing device such as a printer that is coupled to a host computer 108 and that accesses network 104 through browser 106(2) executing on host computer 108.

The system 100 of FIG. 1 includes server 110 that is accessible by computing device 102 via network 104. Network 104 can include a LAN (local area network), a WAN (wide area networks), an intranet, the Internet, or any other suitable communication link. Server 110 can be any computer that acts as a general purpose server to clients such as computing device 102. Thus, server 110 is typically embodied as a general purpose Web server serving content over the Internet or a general purpose file server on a LAN serving file content to computing device 102. Content of particular interest to computing device 102 includes upgrades to firmware and other device specific software. Therefore, server 110 is generally a server that is known to contain recent firmware and/or software upgrades. Such servers are often part of Web sites owned and maintained by a device 102 manufacturer or a third party software vendor that regularly updates the site with firmware and software upgrades. Similarly, a system administrator of a company network might maintain a local server 110 such that recent firmware and software upgrades are available to company employees over a company LAN.

Email recipient 112 of FIG. 1 is implemented as any computer capable of rendering email messages. This includes but is not limited to PC's, laptop computers, PDA's, cell phones and the like. Therefore, email recipient 112 can also be a host computer to a peripheral computing device 102 such as host computer 108 of FIG. 1. Email messages of particular interest to recipient 112 include email notifications sent from computing device 102 regarding available firmware upgrades. Thus, a user operating host computer 108 may receive an email notification initiated by a peripheral computing device 102(2) that indicates a firmware upgrade is available for downloading and installation from a particular server 110. In general, email recipient 112 receives and renders email notifications from computing device 102 regarding firmware upgrades, and through a user interface, permits a user to respond to the notifications.

Email notifications are generated by an email application program that is stored and executed on computing device 102 or on a host computer 108 coupled to computing device 102. In both circumstances however, the email notifications are initiated by special upgrade programming that is typically stored and executed on computing device 102. The special upgrade programming (i.e., upgrade applet 314) is explained in greater detail herein below.

Email notifications include a selectable (e.g., by clicking with a mouse) option that is alternately configured depending on the source of the firmware upgrade that has been located on server 110. In a first configuration where no costs are associated with the upgrade, the option is configured to automatically download and install the upgrade to a computing device 102 without further user input. In a second configuration where costs are associated with the upgrade, the option is configured to initiate a browser on email recipient 112 and navigate to an appropriate location on server 110 permitting the user to make an e-commerce transaction. Email notifications also typically include information regarding the current version of firmware installed on the device, the address to the server 110 location where the firmware upgrade is available, what costs are associated with the firmware upgrade if any, and what billing data may be required to complete an e-commerce transaction.

Both options permit the user to control the timing of the automatic download and installation. Thus, a system administrator who receives an email notification that an upgrade is available for a shared printer 102 can have the upgrade installed at a time (e.g., the middle of the night) when users will not be inconvenienced by the installation process.

Exemplary Embodiment of a System for Upgrading Firmware on a Computing Device

Figure 3:
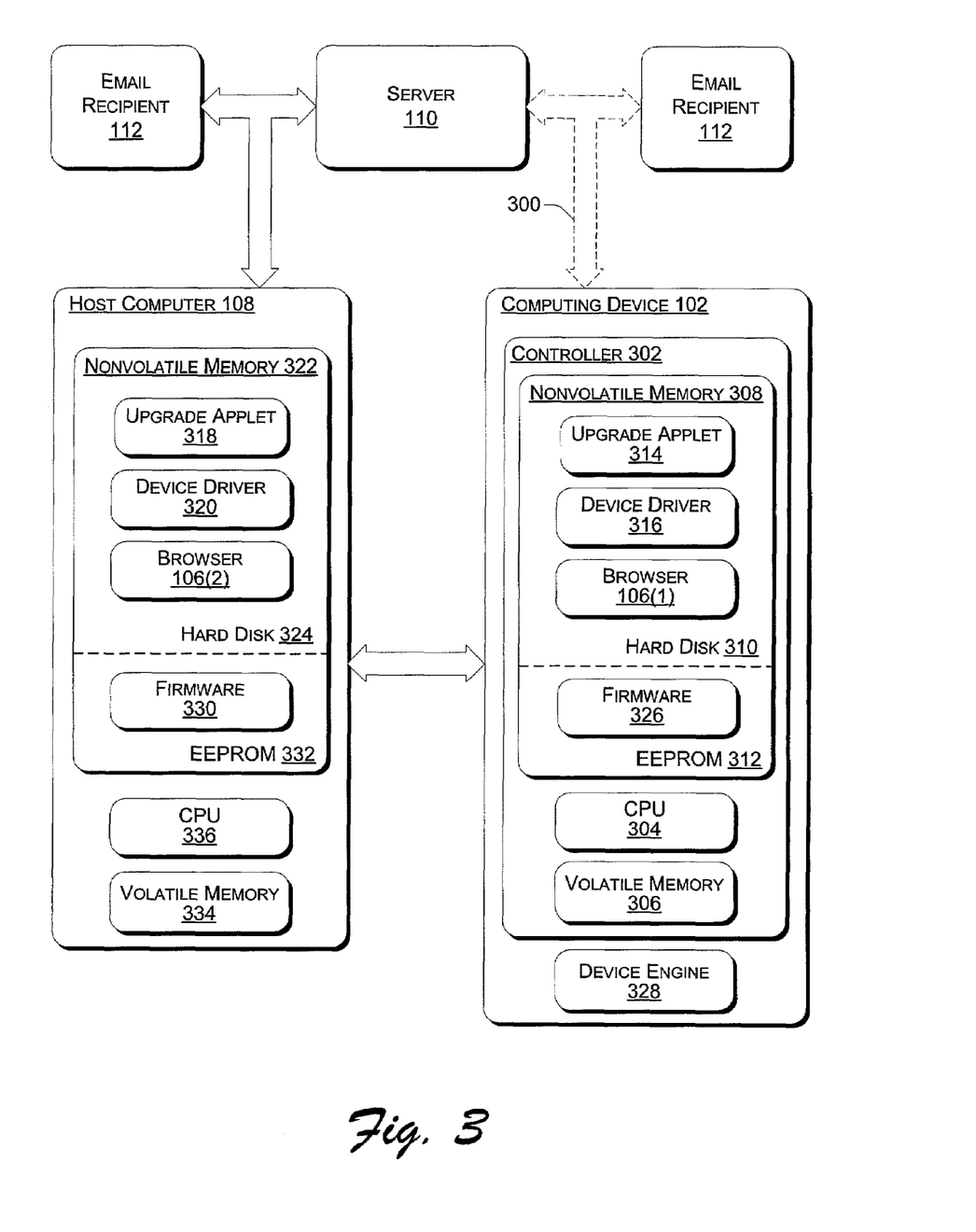
FIG. 3 is a block diagram illustrating a computing device coupled to a host computer in a system environment such as that shown in FIG. 1.

FIG. 3 illustrates an exemplary embodiment of system 100 of FIG. 1 in greater detail. Computing device 102 is embodied as a peripheral computing device (e.g., a printer) coupled to host computer 108. This configuration is illustrated in FIG. 1 by computing device 102(2) coupled to host computer 108. In general, this configuration provides computing device 102 with access to server 110 and email recipient 112 through a communication link set up by host computer 108. However, as discussed above, various computing devices 102(1) can provide their own communication links to server 110 and email recipient 112 and therefore do not need to be coupled to a host computer. This is illustrated in FIG. 3 by the dashed arrows 300.

Computing device 102 of FIG. 3 is embodied as a printer device having controller 302 for processing host computer 108 data. The controller 302 typically includes a data processing unit or CPU 304, a volatile memory 306 (i.e., RAM), and a nonvolatile memory 308. Nonvolatile memory 308 can include various computer storage media such as ROM, flash memory, a hard disk, a removable floppy disk, a removable optical disk and the like. By way of example, FIG. 3 illustrates nonvolatile memory 308 as including hard disk 310 and EEPROM 312. EEPROM 312 can include flash memory which is a special form of EEPROM.

Hard disk 310 generally provides nonvolatile storage of computer readable instructions, data structures, program modules and other data for computing device 102. Thus, upgrade applet 314 module, device driver 316 module, and browser 106(1) module are stored on hard disk 310 and executed on CPU(s) 302. However, these program modules are not limited to being stored on hard disk 310, and may also be stored in various other nonvolatile memory as described above. The program modules vary in their specificity to computing device 102, with device driver 316 being the most specific. That is, device driver 316 contains special knowledge of computing device 102 that other applications do not have but which they need in order to interact with computing device 102. In the configuration of FIG. 3 where computing device 102 is coupled to host computer 108, the upgrade applet 314, device driver 316 and browser 106(1) can be absent from computing device 102 and instead be stored and executed on host computer 108. This is illustrated by upgrade applet 318, device driver 320 and browser 106(2) stored in nonvolatile memory 322 (on hard disk 324) of host computer 108.

EEPROM 312 provides a more secure storage for program code or modules that are typically very specific to computing device 102. Examples of such program code include a basic input/output system (BIOS) where computing device 102 is embodied as a personal computer and a printer control module where computing device 102 is embodied as a printing device. Because such program code is so essential to a specific computing device 102, it is typically loaded into some form of ROM which provides very secure, non-volatile storage that prevents an inadvertent disruption by a user. This essential program code is called firmware because it is usually stored in ROM on a one-time or infrequent basis and seemingly becomes part of the device hardware. Thus, firmware 326 stored in EEPROM 312 of FIG. 3 includes a device control module (e.g., a printer control module) that controls the operation of the device through device engine 328, while firmware 330 stored in EEPROM 332 includes the BIOS for host computer 108.

Upgrade applet 314 of FIG. 3 is a small application program typically written in Java programming language or some version thereof, such as Chai. With little modification, the applet 314 is versatile across various types of computing devices 102 such as those illustrated in FIG. 2. Applet 314 is configured to initiate a search for firmware and software that is specific to computing device 102. Therefore, on computing device 102 of FIG. 3, applet 314 initiates searches for upgrades to device drivers 316 and device control modules that may be stored as firmware 326. The search includes initiating a browser to facilitate navigation over a network to one or more predesignated locations (e.g., URL's) such as might be found on server 110. If a suitable communication link 300 is present for computing device 102, applet 314 will initiate browser 106(1) to facilitate the search. However, assuming communication link 300 is not present and/or browser 106(1) is not installed, applet 314 is configurable to conduct a search through an appropriately coupled host 108 that provides a communication link and a browser 106(2).

In addition to searching URL's and/or local server locations for upgrades, applet 314 is configured to search computing device 102 to determine the current firmware and/or device driver versions installed on device 102. During an upgrade search, the current versions are compared to any upgrades that are located to determine if the upgrades will provide a newer firmware or device driver version than is currently installed on computing device 102.

Applet 314 is further configured to send an email notification or alert to one or more predesignated email addresses or recipient devices to notify a user when an available firmware or device driver upgrade is located. Email recipient devices generally include computing devices such as PC's, laptop computers, PDA's, cell phones and the like. As mentioned above, email notifications are configured by applet 314 to include a selectable option that allows a user to designate a time that an available upgrade will be installed onto computing device 102, along with information related to the upgrade. The selectable option is configured by applet 314 based on whether there are costs associated with an available upgrade. For a no-cost upgrade, the selectable option is configured to initiate a second applet (not shown) embedded in the email that will automatically download and install the upgrade onto computing device 102. Where there is a cost involved with the upgrade, the selectable option is configured with a second applet that initiates a browser to navigate to the location of the upgrade and facilitate an e-commerce transaction to purchase the upgrade. When the transaction is complete, the second applet automatically downloads and installs the upgrade onto computing device 102.

The upgrade applet 314 is configured in part when it is installed onto computing device 102. For example, at installation a user typically configures the applet 314 to execute at a certain periodic rate and conduct upgrade searches automatically. However, the applet 314 can also be set to execute a search only at the request of the user. In addition, the applet 314 is configured by entering the one or more predesignated search locations and the one or more predesignated email addresses through a user interface provided on computing device 102. Further email gateway information may also be required such as POP3 (Post Office Protocol 3) or SMTP (Simple Mail Transfer Protocol) data. Alternatively, all of the configuration information and initial data can be preinstalled in the applet 314 by the device 102 manufacturer or a third party software vendor.

The above discussion generally relates to firmware/driver upgrades on computing device 102 where device 102 is either a stand alone device having its own browser 106(1) and communication link 300 or a peripheral device coupled to a host computer 108 that provides browser 106(2) and a communication link. However, it should be apparent that host computer 108 is also a computing device 102 having volatile 334 and nonvolatile 322 memories and CPU 336 that is capable of executing applet 318 to initiate searches for upgrades to its BIOS control code, for example, stored as firmware 330 on EEPROM 332.

Exemplary Methods for Upgrading Firmware on a Computing device

Example methods for upgrading firmware on a computing device 102 will now be described with primary reference to FIGS. 4 and 5. The methods apply generally to computing devices 102 of FIGS. 1, 2, and 3.

Figure 4:
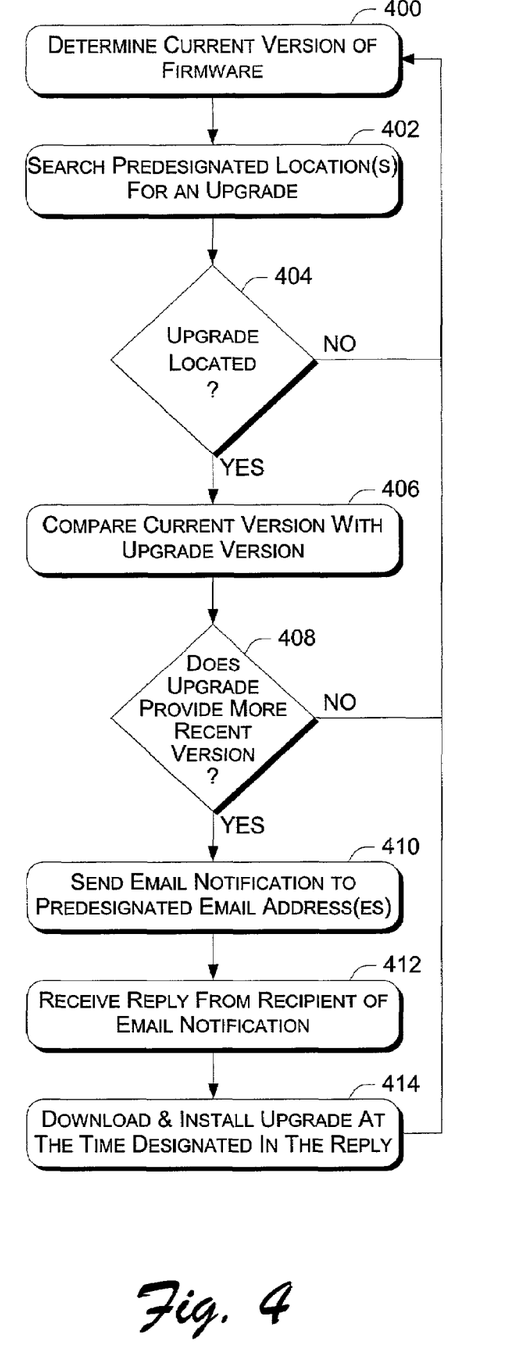
FIG. 4 is a flow diagram illustrating an example method of upgrading firmware on a computing device.

FIG. 4 is a flow diagram that shows an example of a general method for upgrading firmware on a computing device 102. At block 400, an upgrade applet 314 searches computing device 102 and determines the current version of firmware that is installed on the device 102. The version is typically identified by some type of version code (e.g., version 1.3) or date code. The method continues at block 402 with searching one or more predesignated locations for firmware upgrades. The predesignated locations include URL addresses accessible on the Internet and addresses to locations on servers that are part of other networks such as a corporate LAN.

At block 404, if all the predesignated locations are searched and no upgrade is found, the method begins again at block 400 at the next prescheduled time period or upon a user request. If an upgrade is located, the method proceeds from block 404 to block 406 where the current firmware version is compared to the upgrade version. If it is determined at block 408 that the upgrade does not provide a more recent firmware version than already exists on computing device 102, then the method begins again at block 400 at the next prescheduled time period or upon a user request. However, if the upgrade does provide a more recent firmware version than exists on computing device 102, then the method proceeds from block 408 to block 410.

At block 410, an email notification is sent to one or more predesignated email addresses notifying the email recipient of the available firmware upgrade. At block 412, a reply is received from the recipient of the email notification indicating the upgrade is to be downloaded and installed onto computing device 102. The reply includes a user-designated time that controls when the upgrade is downloaded and installed at block 414. Once an upgrade is installed, the method begins again at block 400 so that the most recent firmware versions are continually made available for installation on computing device 102.

Figure 5:
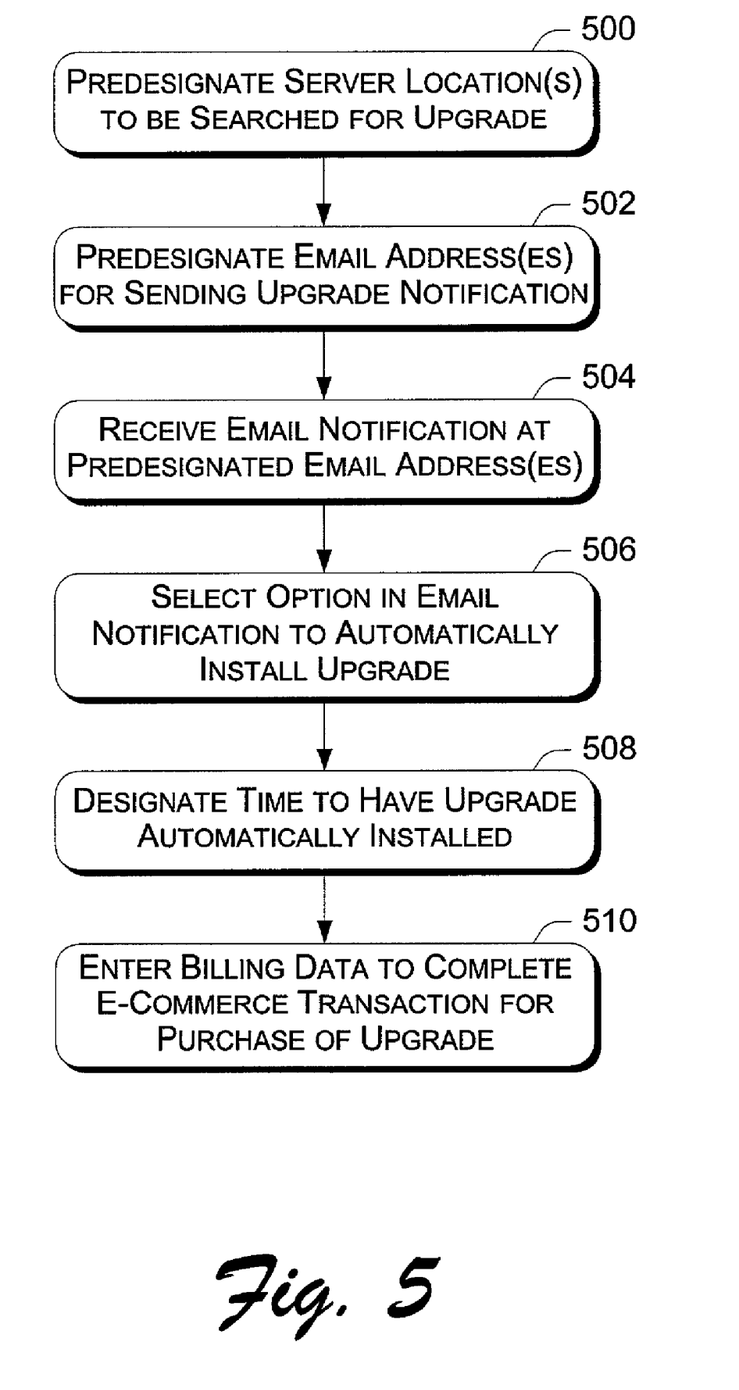
FIG. 5 is a flow diagram illustrating an additional example method of upgrading firmware on a computing device.

FIG. 5 is a flow diagram illustrating another example of a general method for upgrading firmware on a computing device 102. At block 500, one or more locations that are likely to provide the most recent firmware upgrades are predesignated to be searched. At block 502, one or more email addresses are predesignated as addresses to which an email notification will be sent in order to alert a user to an available upgrade. The predesignated search locations and email addresses are typically programmed into an upgrade applet 314 by a user upon installation of the applet 314 onto computing device 102.

At block 504, an email notification is received at the one or more predesignated email addresses. The email recipient is typically a computing device accessible by a user who predesignated the email addresses. At block 506, the user selects an option in the email notification to have the upgrade automatically installed on computing device 102. In selecting the option to have the upgrade automatically installed, the user also designates a time when the installation will occur as shown in block 508. In addition, if there is a cost associated with installing the firmware upgrade, an e-commerce transaction will be completed requiring the entry of billing information by the user as shown in block 510.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method of upgrading firmware on a peripheral computing device comprising:
   determining a current version of firmware installed on the peripheral computing device, wherein the determining is performed by an applet running on the peripheral computing device;
   searching a pre-designated location for a firmware upgrade, wherein the searching is preformed by an embedded browser configured to operate without user intervention within the peripheral computing device according to a prescheduled time period, and wherein operation of the browser is initiated and directed by the applet running on the peripheral computing device;
   sending an email notification from the peripheral computing device to one or more pre-designated email addresses if the firmware upgrade is found, wherein the email notification is sent by the applet running on the peripheral computing device;
   receiving the email notification on a host computer remote from the peripheral computing device, wherein the email notification is rendered for reading by a user logged into the host computer, and wherein the email provides an option of installing the firmware upgrade, an option for a selected time period of installation, and an interface allowing the user to indicate selections by mouse click;
   downloading the firmware update, from the pre-designated location, at the selected time period, to the peripheral computing device; and
   installing the firmware upgrade onto the peripheral computing device during the selected time period.

2. A method as recited in claim 1, wherein the searching further comprises:
   comparing the current version of firmware with the firmware upgrade to determine if the firmware upgrade will provide a more recent version of firmware.

3. A method as recited in claim 1, wherein the email notification provides a link to an e-commerce site configured to allow the user to purchase the firmware upgrade prior to installing the firmware upgrade.

4. A method as recited in claim 3, wherein the the peripheral computer device is a printer, and the browser is embedded within the printer.

5. A method as recited in claim 1 wherein installing the firmware upgrade further comprises:
   receiving a reply from a recipient of the email notification comprising a user-designated time; and
   at the user-designated time, downloading and installing the firmware upgrade onto the computing device from the predesignated location.

6. A method as recited in claim 1, wherein the installing the firmware upgrade occurs automatically when the firmware upgrade is found.

7. A method as recited in claim 1, wherein the predesignated location is a plurality of predesignated locations comprising:
   a URL address accessible via the Internet; and
   a local server address accessible via a local network.

8. A method as recited in claim 1, wherein the one or more predesignated email addresses comprise a plurality of pre-designated email addresses.

9. A method as recited in claim 1, wherein the email notification comprises:
   a selectable option configured to automatically install the firmware upgrade onto the computing device; and
   information comprising:
      the current version of firmware;
      the location of the firmware upgrade;
      the cost associated with the firmware upgrade; and
      billing data required to complete an electronic commerce transaction to purchase the firmware upgrade.

10. A method as recited in claim 1, wherein the peripheral computing device is embodied as a device selected from a group of devices comprising:
    a printer;
    a scanner,
    a copier;
    a facsimile machine;
    a multifunction peripheral device;
    a modem;
    a cellular telephone;
    a personal computer; and
    a personal digital assistant (PDA).

11. A method as recited in claim 1, wherein the firmware is device driver software and the firmware upgrade is a device driver upgrade.

12. A computer-readable medium comprising computer executable instructions configured to cause a computer to perform the method of claim 1.

13. A computer-readable medium as recited in claim 12, wherein the computer executable instructions are further configured to cause a computer to perform the method of claim 1 automatically on a periodic basis.

14. A computer-readable medium as recited in claim 12, wherein the computer executable instructions are further configured to cause a computer to perform the method of claim 1 at the request of a user.

15. A computer implemented method of upgrading firmware on a peripheral comprising:
    predesignating a server location to be searched for a firmware upgrade;
    determining a current version of firmware installed on the peripheral device, wherein the determining is performed by an applet running on the peripheral device;
    searching the pre-designated server for the firmware upgrade, wherein the searching is performed by an embedded browser configured to operate without user intervention, and wherein operation of the browser is initiated and directed by the applet running on the peripheral device;
    predesignating an email address to which an email notification will be sent when the firmware upgrade is found, wherein the email address for receiving the email notification is accessible from a computing device remote from the peripheral device;
    sending an email notification from the peripheral device to the pre-designated email address if the firmware upgrade is found, wherein the email notification is sent by the applet running on the peripheral device;
    receiving the email notification at the email address, wherein the email notification is rendered for reading by a user logged into the computing device remote from the peripheral device, and the email notification comprises a selectable option configured to automatically install the firmware upgrade on the computing device, and an option for a selected time period of installation, and an interface allowing the user to indicate selections by mouse click;

downloading the firmware update, from the pre-designated location, at the selected time period, to the peripheral computing device; and installing the firmware upgrade onto the peripheral device during the selected times period.

16. A method as recited in claim 15, further comprising:
in response to a selection of the selectable option, requesting a time at which the firmware upgrade will be automatically installed.

17. A method as recited in claim 15, further comprising:
in response to a selection of the selectable option, requesting billing data required to complete an electronic commerce transaction to purchase the firmware upgrade.

18. A method as recited in claim 15, wherein the predesignating a server location comprises:
configuring an applet on the computing device with an address location of the server.

19. A method as recited in claim 15, wherein the firmware is device driver software and the firmware upgrade is a device driver upgrade.

20. A peripheral device comprising:
firmware stored in nonvolatile memory on the peripheral device; and
an upgrade applet, operable on the peripheral device and configured to update the firmware on the peripheral device, by:
determining a current version of the firmware;
searching a pre-designated location for a firmware upgrade, wherein the searching is performed by an embedded browser configured to operate without user intervention within the computing device according to a prescheduled time period, and wherein operation of the browser is initiated and directed by the applet;
sending an email notification from the upgrade applet to one or more pre-designated email addresses if the firmware upgrade is found, wherein the email notification is sent by, and the one of the one or more pre-designated email addresses is stored on, the applet running on the computing device, wherein the email notification is configured to be received on a host computer remote from the peripheral computing device, wherein the email notification is suitable for rendering for reading by a user logged into the host computer, and wherein the email notification provides the option of installing the firmware upgrade, an option for a selected time period of installation, and an interface allowing the user to indicate selections by mouse click;
downloading the firmware update, from the pre-designated location, at the selected time period, to the peripheral computing device; and
installing the firmware upgrade onto the peripheral computing device during the selected time period.

21. A peripheral device as recited in claim 20, wherein the email notification comprises:
a selectable option to have the available firmware upgrade installed at a user-designated time; and
information comprising:
the current version of the firmware; and
the location of the available firmware upgrade.

22. A peripheral device as recited in claim 21, wherein the email notification further comprises:

information comprising:
a cost associated with the available firmware upgrade; and
billing data required to complete an electronic commerce transaction to purchase the available firmware upgrade;
and wherein the selectable option comprises:
a second applet configured to browse to the predesignated location and install the available firmware upgrade upon completion of the electronic commerce transaction.

23. A peripheral device as recited in claim 20 embodied as a device selected from a group of devices comprising:
a printer
a scanner,
a copier;
a facsimile machine;
a multifunction peripheral device;
a modem;
a cellular telephone;
a personal computer, and
a personal digital assistant (PDA).

24. A peripheral device as recited in claim 20, wherein the nonvolatile memory comprises electrically erasable programmable read-only memory (EEPROM).

25. A system for upgrading firmware comprising:
a computing device;
a peripheral device, in communication with the computing device; and
an upgrade applet configured for operation on the peripheral device, wherein the upgrade applet is configured for:
determining a current version of firmware installed on the peripheral device, wherein the determining is performed by the upgrade applet running on the peripheral device;
searching a pre-designated location for a firmware upgrade, wherein the searching is performed by an embedded browser configured to operate without user intervention within the peripheral device according to a prescheduled time period, and wherein operation of the browser is initiated and directed by the applet;
sending an email notification from the peripheral device to one or more pre-designated email addresses if the firmware upgrade is found, wherein the email notification is sent by, and the one of the one or more pre-designated email addresses is stored on, the applet running on the peripheral device;
receiving the email notification on the computing device, wherein the email notification is rendered for reading by a user logged into the computing device, and wherein the email provides the option of installing the firmware upgrade, an option for a selected time period of installation, and an interface allowing the user to indicate selections by mouse click;
downloading the firmware update, from the pre-designated location, at the selected time period, to the peripheral device; and
installing the firmware upgrade onto the peripheral device during the selected time period.

* * * * *

UNITED STATES PATENT AND TRADEMARK OFFICE
CERTIFICATE OF CORRECTION

PATENT NO. : 7,146,412 B2 Page 1 of 1
APPLICATION NO. : 09/941212
DATED : December 5, 2006
INVENTOR(S) : Paul F. Turnbull It is certified that error appears in the above-identified patent and that said Letters Patent is hereby corrected as shown below:

In column 9, line 12, in Claim 1, delete "preformed" and insert -- performed --, therefor.

In column 9, line 45, in Claim 4, after "wherein the" delete "the".

In column 9, line 48, in Claim 5, after "claim 1" insert -- , --.

In column 10, line 13, in Claim 10, delete "scanner," and insert -- scanner; --, therefor.

In column 10, line 37, in Claim 15, after "peripheral" insert -- device, --.

In column 11, line 5, in Claim 15, delete "times" and insert -- time --, therefor.

In column 12, line 14, in Claim 23, after "primer" insert -- ; --.

In column 12, line 15, in Claim 23, delete "scanner," and insert -- scanner; --, therefor.

In column 12, line 21, in Claim 23, delete "computer," and insert -- computer; --, therefor.

Signed and Sealed this

Eleventh Day of August, 2009

David J. Kappos
*Director of the United States Patent and Trademark Office*